K. W. BAYER.
STRAW SPREADING ATTACHMENT FOR MANURE DISTRIBUTERS.
APPLICATION FILED MAR. 25, 1913.
1,109,896.
Patented Sept. 8, 1914.
4 SHEETS—SHEET 1.
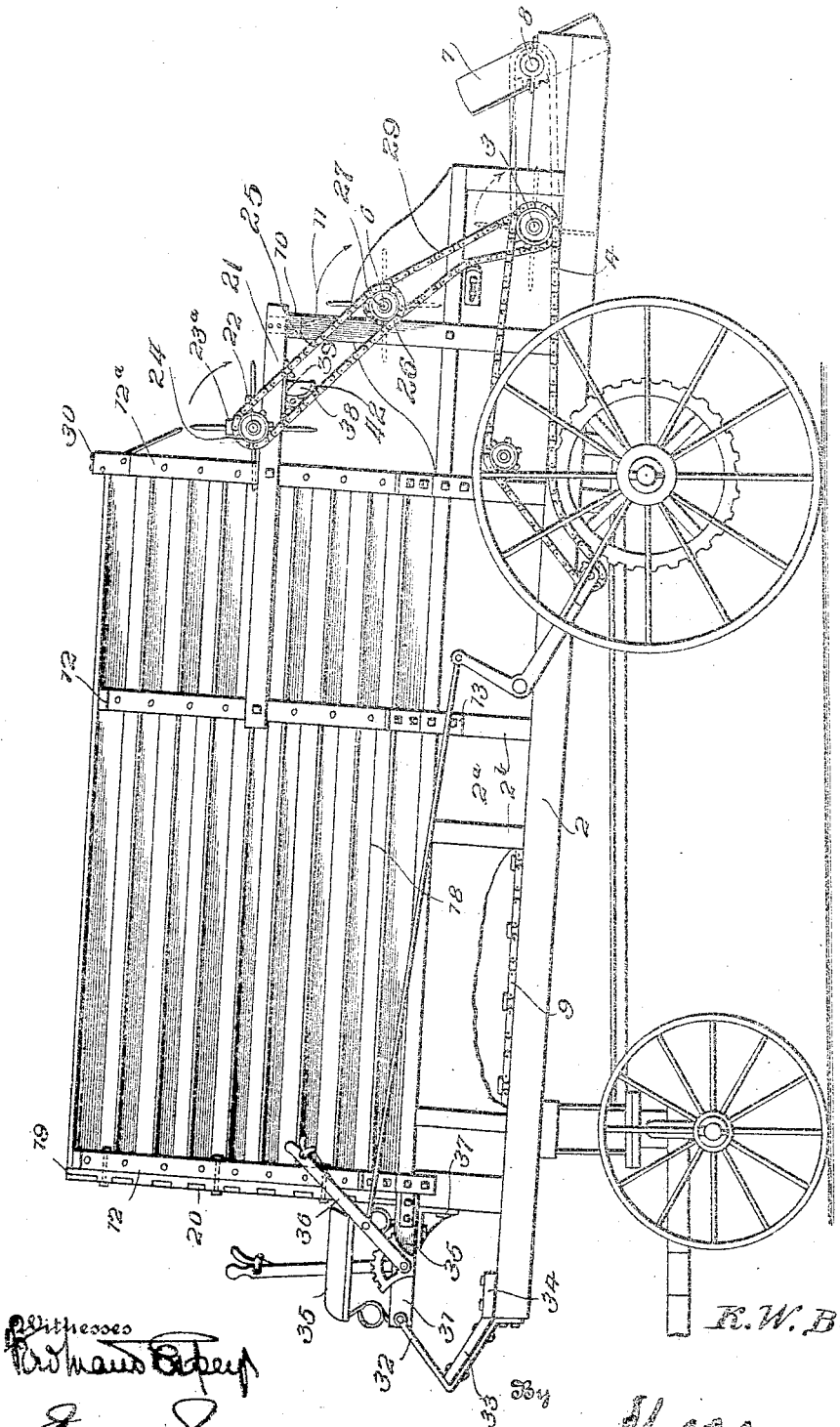

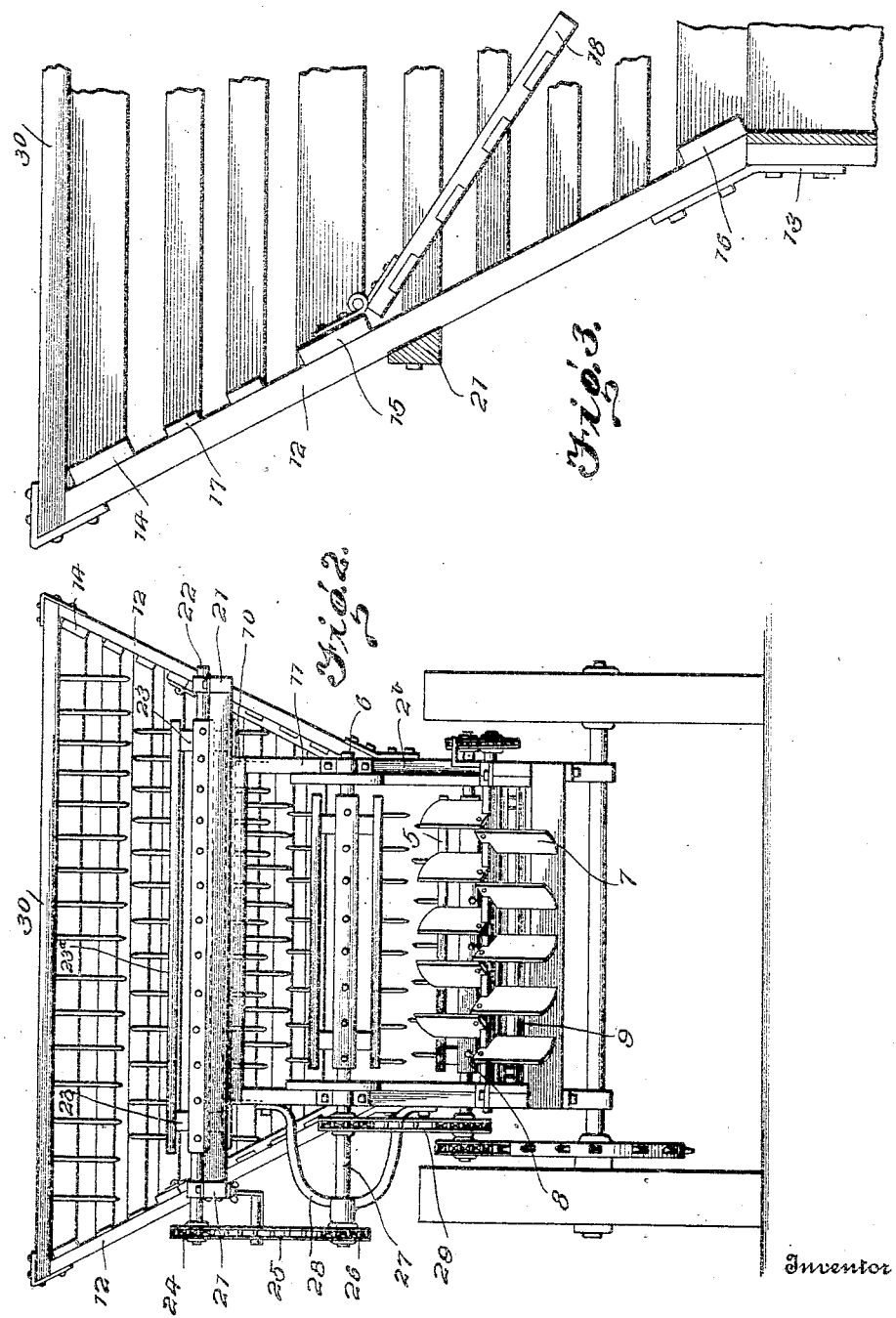

K. W. BAYER.
STRAW SPREADING ATTACHMENT FOR MANURE DISTRIBUTERS.
APPLICATION FILED MAR. 25, 1913.
1,109,896.
Patented Sept. 8, 1914.
4 SHEETS—SHEET 3.
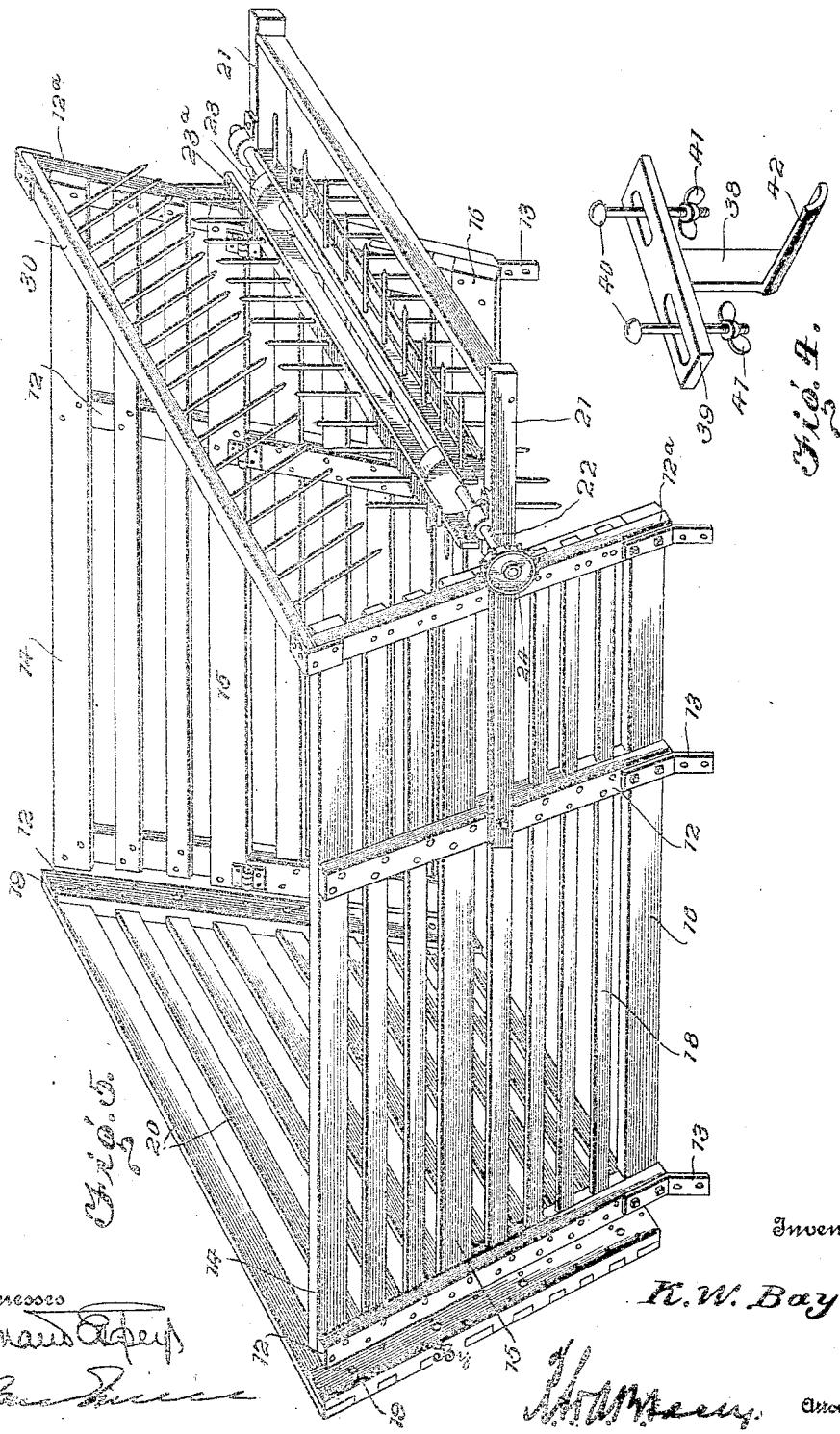

K. W. BAYER.
STRAW SPREADING ATTACHMENT FOR MANURE DISTRIBUTERS.
APPLICATION FILED MAR. 25, 1913.

1,109,896.

Patented Sept. 8, 1914.

4 SHEETS—SHEET 4.

Witnesses

Inventor
K. W. Bayer.
By
Attorneys

UNITED STATES PATENT OFFICE.

KARL W. BAYER, OF CHASE, KANSAS.

STRAW-SPREADING ATTACHMENT FOR MANURE-DISTRIBUTERS.

1,109,896.

Specification of Letters Patent.

Patented Sept. 8, 1914.

Application filed March 25, 1913. Serial No. 756,787.

*To all whom it may concern:*

Be it known that I, KARL W. BAYER, a citizen of the United States, residing at Chase, in the county of Rice and State of Kansas, have invented certain new and useful Improvements in Straw-Spreading Attachments for Manure-Distributers, of which the following is a specification.

My invention relates to distributing mechanism and particularly to means for distributing straw.

Straw is spread or scattered over sandy soil to protect the wheat from blowing and most of this work has heretofore been done by hand, and the primary object of my invention is to provide an attachment adapted to be applied to manure spreaders whereby straw may be carried and distributed in the same manner that manure is distributed.

A further object of the invention is the provision of an attachment in the form of a rack adapted to be placed upon the body of a manure spreader, this rack being adapted to contain a relatively large amount of straw and being provided with a beater whereby the straw may be fed to the usual scatterer of a manure distributer.

A further object of the invention is the provision of means whereby this rack with its beater may be readily attached to or detached from the body of a manure spreader, and still another object is to so form the rack that it may remain upon the body of the manure spreader and portions of the sides of the rack be opened up so as to permit the manure to be shoveled into the body in the usual manner and not compel the manure to be loaded over the top of the rack.

A further object is the provision of means whereby the seat and actuating mechanism of the manure spreader may be disposed forward of the body when the attachment is in use.

Other objects will appear in the course of the following description.

Figure 6:
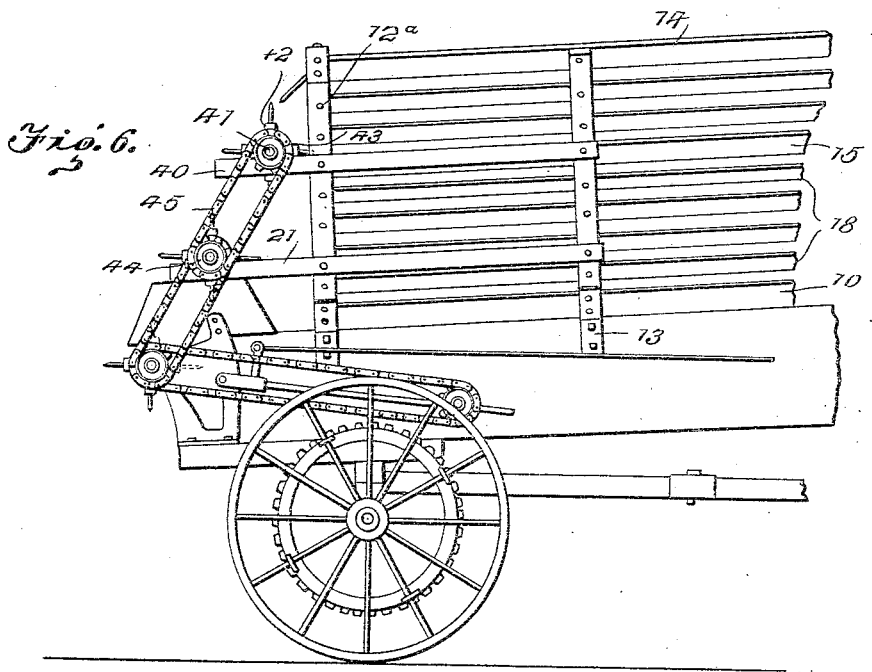
Figure 7:
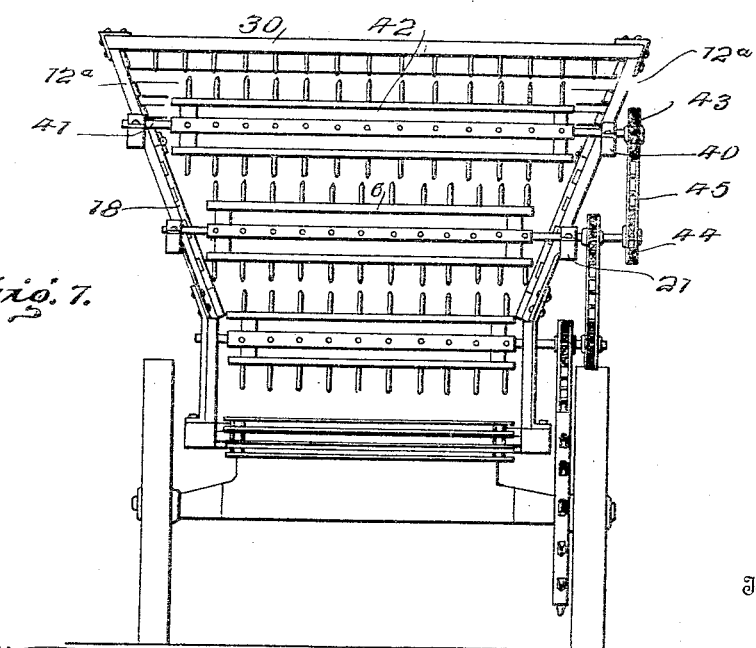

My invention is illustrated in the accompanying drawings wherein:

Figure 1 is a side elevation of a manure distributer provided with my attachment whereby it may be used for distributing straw or like material. Fig. 2 is a rear end elevation of the distributer shown in Fig. 1 with my attachment applied thereto. Fig. 3 is a fragmentary sectional view of the straw rack and showing the hinged section of the rack open to permit the introduction of material into the body of the distributer. Fig. 4 is a perspective detail view of the chain tightener used in connection with my device. Fig. 5 is a perspective view of the straw scattering attachment removed from the distributer. Fig. 6 is a side elevation of the rear end of a manure spreader showing a modified form of my invention. Fig. 7 is a rear view of the form shown in Fig 6.

Corresponding and like parts are referred to in the following description and indicated in all the views of the accompanying drawings by the same reference characters.

Referring to these drawings, 2 designates a rectangular body of the usual form and adapted to contain manure. This body is mounted upon the usual forward and rear trucks and may be constructed in any suitable manner. The rear end of the body is provided with the usual rotatable beater 3 driven in any suitable manner but usually driven from the rear axle by means of sprocket chains 4. As illustrated, this beater includes a plurality of transversely extending bars 5 provided with outwardly projecting teeth, and disposed above the beater 3 is an auxiliary beater 6 which is disposed in advance of the beater 3. This beater 6 rotates in the same direction as the beater 3. Rearward of the beater 3 and mounted upon rearward extensions of the side boards of the body 2 are a plurality of scatterers consisting as illustrated of angularly arranged blades 7 mounted upon a transverse shaft 8, these scatterers being so disposed that they will scatter the manure or straw laterally or fanwise so that the manure so scattered will be wider than the width of the body. The shaft 8 of the scatterer is driven in any usual manner as by sprocket chains extending from and operatively connected to a sprocket upon the shaft of the beater 3.

Disposed in the bottom of the body is a conveyer 9 of any usual pattern which acts to carry the manure, straw or other contents of the body rearward to the beater 3. Mounted upon the sides of the body and extending over the upper beater 6 is a bar 10 having downwardly extending wires or pins 11. All these parts heretofore described are of the character ordinarily found in manure spreaders and I do not wish to be limited in any way to this particular form of manure spreader as these elements form no part of my invention.

A manure spreader such as that above described is adapted in a small way for scattering straw, but the trouble with it is that it is not adapted to contain any large amount of straw and this renders it ineffective. If it is provided with a rack for containing a large amount of straw, the straw is piled up so high that as the lower portion of the straw is cut away by the beaters 3 and 6, the straw will topple over and it will not be fed properly to the distributers 7, or else there will be a layer of straw two or more feet in thickness which will be conveyed over the beater 6 in chunks or bunches and these bunches of straw will fall upon the ground and not be properly distributed.

My invention consists in the provision of a rack adapted to contain a relatively large amount of straw, and in connection therewith I provide an auxiliary beater disposed above and forward of the beater 6 and acting to tear up these bunches and cause the straw to be conveyed onto the scatterer 7 evenly. The rack is so constructed that it may be readily fixed to or removed from the body of the distributer and is designed to cause the body to hold two or three times as much straw as if the rack were not used.

The rack consists of a plurality of outwardly diverging uprights designated 12. As illustrated, there are three of these uprights on each side of the rack. These uprights rest upon the top edge of the side 2ª of the wagon body 2 and each of the uprights 12 is provided at its lower end with an angle iron 13 perforated for the passage of bolts. The upright braces 2ᵇ of the side boards 2ª are also perforated for the passage of these bolts so that when the rack is placed upon the body it will rest upon the upper edges of the side boards 2ª and be bolted to the members 2ᵇ. There are three of these uprights 12 on each side of the rack and these are connected by three longitudinally extending strips 14, 15 and 16 (see Fig. 5). These strips are relatively wide and relatively heavy. Disposed between the strips 14 and 15 are a plurality of relatively light and narrow spaced strips 17. Hinged to the strip 15 is a rack section 18 composed of longitudinally extending, relatively light and narrow strips connected to form a frame, this frame as before stated being hinged along its upper edge to the strip 15. Thus the hinged section 18 may be either turned down into alinement with the fixed section above or may be lifted up like a door for a purpose to be later stated.

The side frames formed by the uprights 12 and the longitudinally extending members 14, 15, 16 and 17 are closed at the front end by a frame composed of laterally diverging pieces 19 connected by transverse slats 20 and by a top cross piece of relatively heavy material. This frame is detachably bolted to the front end of the sides so that in case the rack is removed the front end can be unbolted and taken off. Preferably the slats 20 are mortised into the uprights 19 of the frame, thus fitting flush with the front faces of the members 19 and clearing the seat.

Attached to the middle upright 12 on each side and to the rear upright 12ª on each of the side pieces is a rearwardly extending supporting member in the form of a two inch by four inch beam, this being designated 21. This member is adapted to rest upon the cross bar 10, and mounted in bearings upon these members is the shaft 22 of the uppermost or auxiliary beater. This beater consists of the oppositely disposed end members 23 and the transversely extending bars 23ª provided with outwardly projecting pins or teeth. The shaft 22 extends out beyond the bearing on one of the beams 21 and attached to this shaft is a sprocket wheel 24 over which passes a sprocket chain 25 which in turn is connected to a sprocket wheel 26 mounted on the projecting extremity of the shaft 27 of beater 6. The projecting extremity of the shaft 27 is supported in bearings mounted upon a bracket 28, the legs of which bracket are attached to the side boards of the body 2. The shaft 27 in turn is driven from the shaft of the main beater 3 in any suitable manner as by the sprocket chain 29.

Attached to the rearward pair of uprights 12ª and extending transversely across the rear end of the rack just forward of the beater 23ª, is a cross bar 30 provided with downwardly projecting pins, wires or teeth, these wires being shown as extending downward and rearward to a point immediately above the axis of the beater 23ª. Preferably this cross bar 30 is vertically adjustable and is supported to that end upon the uprights 12ª. Its function is to prevent the extrusion of straw above the beater 23ª.

The operation of the invention as far as described is, of course, obvious. It operates practically on the principle of all manure spreaders. As the machine moves along the field, the rear driving wheels through the sprocket chains will actuate the primary beater 3. This through the sprocket chain 29 will actuate the secondary beater 6, and this through the sprocket chain 25 will actuate the uppermost or auxiliary beater 23ª, all of these beaters moving in the same direction. The primary beater 3 will discharge the straw upon the scatterer 7; the secondary beater 6 will discharge the straw immediately in contact with it upon the beater 3, and the auxiliary beater 23ª will discharge the straw upon the beaters 6 and 3 and upon the distributer 7. Thus the straw along the whole height of the mass carried in the rack will be discharged, torn apart, discharged upon the scatterer 7 and scattered. As the machine advances, the conveyer in the bottom of the body will carry the mass of straw rearward toward the beaters until the whole quantity of straw within the rack has been discharged.

Preferably the rack will extend back as far as the forward end of the body and hence it is necessary to provide means for supporting the seat, the shifting lever and other like parts in front of the forward end of the body. To this end I provide supporting brackets 31 which are bolted by cleats to the front end of the box or body. These projecting members 31 are also supported by means of upwardly extending braces 32 which extend downward and beneath the footboard 33 and which are then bolted to the cross piece 34 on the forward end of the supporting frame of the body. The seat 35 is supported by springs upon the outwardly projecting members 31. One of the outwardly projecting members 31 is provided with the rack 35 over which passes the feed lever 36 which is pivoted at its lower end as at 37 and connected to the feed regulating mechanism in a manner well known to those versed in the art.

Mounted upon one of the longitudinally extending members 2ᵉ adjacent the end thereof is a chain tightener 38 (shown in detail in Fig. 4) which is adapted to engage the chain 29. This chain tightener as illustrated has a base 39 which is longitudinally slotted and which contacts with the under side of the member 21. Through the slots of this base pass bolts 40 which also pass through the member 21. These bolts are provided with wing nuts 41. It will be obvious that by loosening these bolts, the chain tightener may be longitudinally shifted along the member 21 and then held in any desired position by tightening the nuts. From the base 39 the chain tightener extends downward and then is laterally extended as at 42, this lateral extension being rounded to provide a surface over which the chain may readily pass. By shifting this chain tightener in one direction it will engage the chain and tighten it up, while shifting it in the other direction it will release the chain allowing it to slacken.

The advantages of this machine are many. It has been found in practice that this machine will spread all kinds of straw, whether rotten wheat, dry, loose or in bunches, and whether the straw be long or short. Only one man is needed to load the spreader with the straw rack and only one man is needed to distribute the straw and manipulate the controlling levers. By opening the doors or gates formed by the hinged sections 18 and leaving them open, the distributer will act like the ordinary manure distributer and can be used in the ordinary manner for hauling and spreading manure. The straw rack does not prevent this use of the manure spreader but provides for turning the manure spreader into a straw spreader at any time, and this spreader may be used either for spreading the straw or for loading and hauling it. The straw rack is intended to hold three or four times as much straw as the spreader body would and it unloads and spreads the straw at the same time and much faster than it could be done by a workman.

The invention is simple, effective in practice and can be readily adapted to all forms of manure spreaders.

Many forms of manure spreaders have only one beater and do not use a scatterer. In this form of manure distributer it is necessary to provide a plurality of auxiliary beaters located above the main beater or distributing roller. Such a form as this is illustrated in Figs. 6 and 7, wherein the rack is shown as being provided not only with the rearwardly extending supporting beam 21, but with an additional rearwardly extending supporting beam 40 bolted to the uprights 12. Mounted upon this beam 40 is the beater shaft 41 constructed in the same manner as previously described and provided with the longitudinally extending bars 42 formed with the outwardly projecting pins or teeth. This beater shaft 41 carries upon it the sprocket wheel 43, and the beater shaft 22 carries an additional sprocket wheel 44 from which a chain 45 runs to the sprocket wheel 43.

It has been found by experience that two small beaters work more successfully than one large one, as the two small beaters have less weight. It will be noted that the two beaters 22 and 41 on the straw rack are placed one forward of and above the other. In practice, the upper beater will take a certain amount of straw and throw it out upon the next lower beater and the uppermost beater will take the straw intended for it and cast it out before the next lower beater engages the straw; hence there is no chance of clogging, as would be the case were the beaters placed one directly above the other.

While I have illustrated what I believe to be the best form of my invention, I do not wish to be limited thereto as it is obvious that many changes might be made therein without departing from the spirit of the invention.

What I claim is:

1. The combination with a distributer including a body and a rotatable beater at the rear of the body, of a rack adapted to be detachably supported on the body, said rack having upwardly extending sides and a forward end, the rear end of the rack being open, a cross bar extending across the upper end of the rear of the rack and having downwardly extending teeth and forming thereby a partial closure for the upper end of the rack, a rotatable beater carried at the rear end of the rack and disposed above and forward of the first named beater and below and rearward of said cross bar and teeth, means operatively connecting the first named beater to the traction wheels of the distributer, and means operatively connecting the first named beater to the second named beater.

2. In a manure distributer, a body, a rack mounted upon the body, a plurality of beaters carried rearward of the rack and above the body, said beaters being arranged in stepped relation in a downwardly and rearwardly extending series, and a cross bar extending across the upper end of the rack at the rear thereof and having downwardly and rearwardly extending teeth, said cross bar being disposed in a plane rearward of the uppermost beater.

3. A straw scattering attachment for manure distributers including a rack having upwardly and outwardly inclined sides, one end of the rack being closed and the rear end open, the upper portion of each side of the rack being formed of longitudinally extending fixed slats, the lower portion of each side of the rack being formed by a slatted section extending longitudinally the whole length of the rack hinged to the upper portion of the adjacent side, supporting members projecting from the rear end of the rack, and a rotatable beater mounted upon said supporting members and adapted to be operatively connected to the driving mechanism of the distributer.

4. The combination with a distributer including a body and a rotatable beater disposed at the rear end of the body, of a rack supported on the body, a plurality of beaters carried by the rack and disposed above the first named beater, the beaters on the rack being arranged one above another with the uppermost beater forward of the lower beater and the lower beater on the rack being forward of the beater mounted upon the body, and means for rotating the beaters all in the same direction.

In testimony whereof I affix my signature in presence of two witnesses.

KARL W. BAYER. [L. S.]

Witnesses:
 HENRY A. KRAPP,
 ROBERT SHOUSE.